United States Patent
Yates, Jr.

[15] 3,638,296
[45] Feb. 1, 1972

[54] CONTAINER CLOSURE TOOL AND METHOD FOR USE THEREOF

[72] Inventor: George Yates, Jr., Glendale, Calif.
[73] Assignee: Growth International Industries Corp., Cleveland, Ohio
[22] Filed: Feb. 9, 1970
[21] Appl. No.: 9,617

Related U.S. Application Data

[63] Continuation-in-part of Ser. No. 781,556, Dec. 5, 1968, Pat. No. 3,499,574.

[52] U.S. Cl. ................................................29/400, 29/200
[51] Int. Cl. ....................................B23p 17/00, B23p 19/00
[58] Field of Search..................29/400 C, 200, 200 B, 208 B, 29/400, 451, 453, 235

[56] References Cited

UNITED STATES PATENTS

| | | | |
|---|---|---|---|
| 1,963,202 | 6/1934 | Hume | 29/200 H X |
| 2,306,619 | 12/1942 | Flackbarth | 29/200 H X |

Primary Examiner—Thomas H. Eager
Attorney—Ronald L. Engel, Daniel W. Vittum, Jr. and Gomer W. Walters

[57] ABSTRACT

A tool which may be used to lock a closure having a movable sealing member over the opening of a container body comprises a rim corresponding in shape to the configuration on the closure but having dimensions slightly larger than the closure so that it may be slipped downwardly thereover. A handle is attached to the rim, and a series of studs disposed on the inner surface of the rim are adapted to contact the movable sealing member and move it into a locked position when the rim is lowered over the closure. A method of using the tool to lock a closure having a movable sealing member over the open end of the container body comprises placing the closure over the open end of the container body with the sealing member in an unlocked position, positioning the tool over the closure so that the series of studs contacts the closure member and causing relative movement between the tool and the closure so that the tool causes the sealing member to move to a locked position.

6 Claims, 10 Drawing Figures

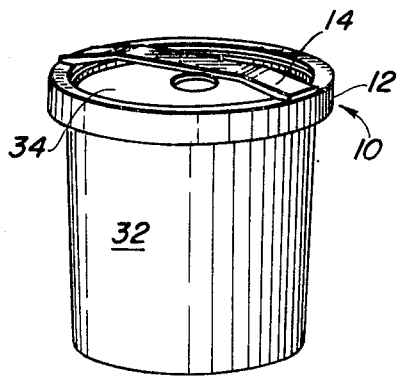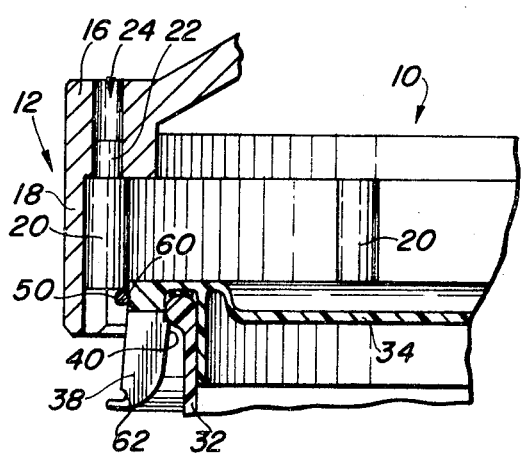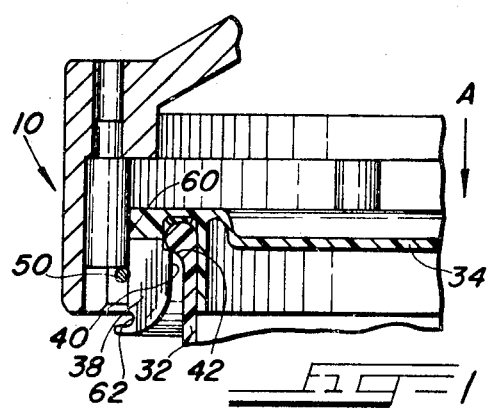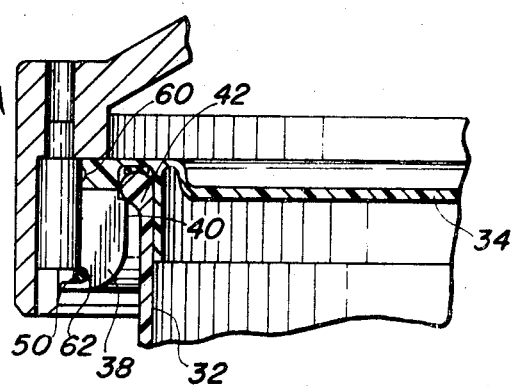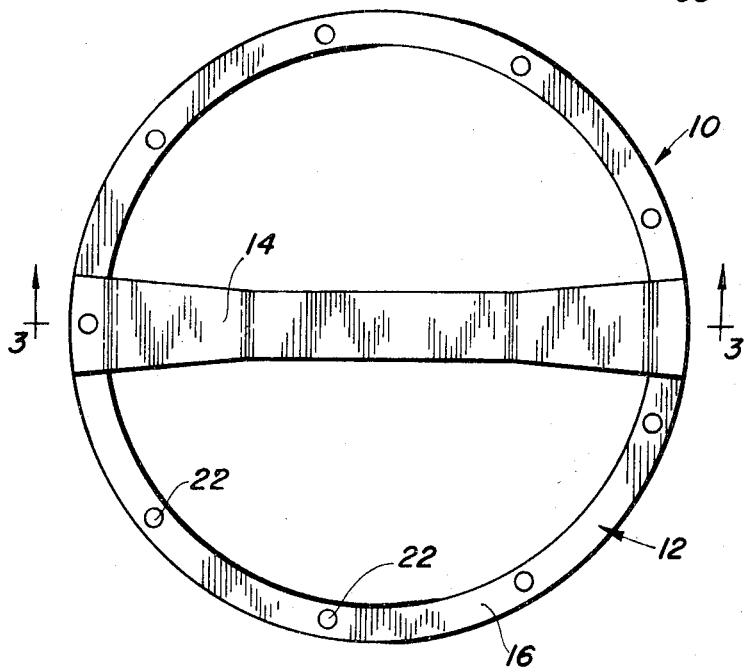
INVENTOR
GEORGE YATES, JR

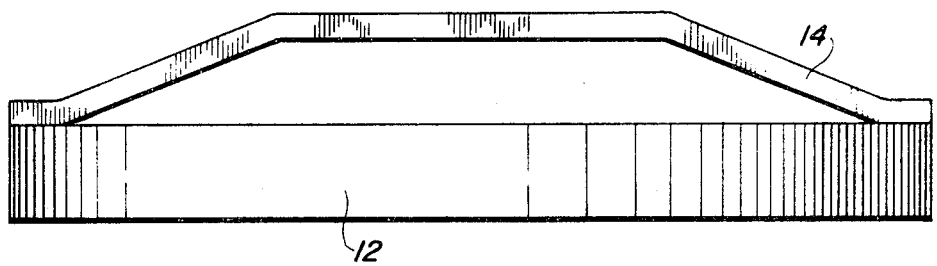
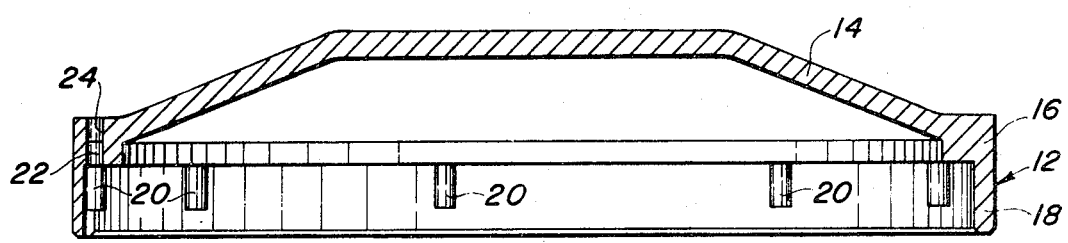
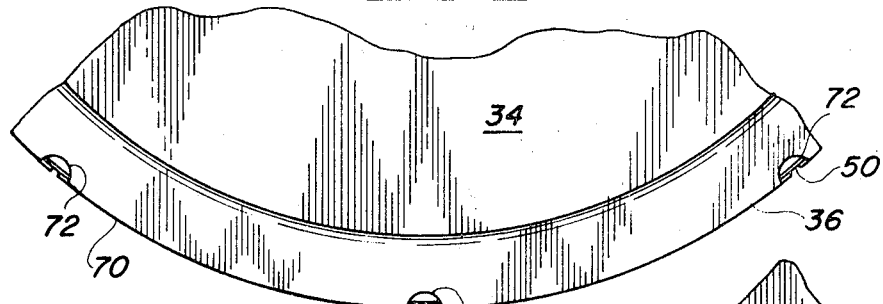
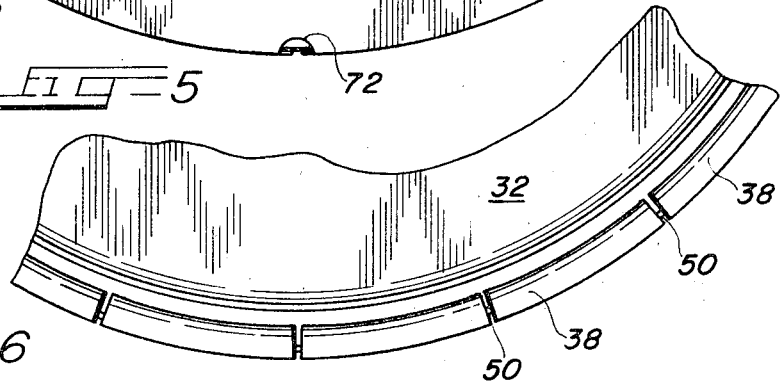
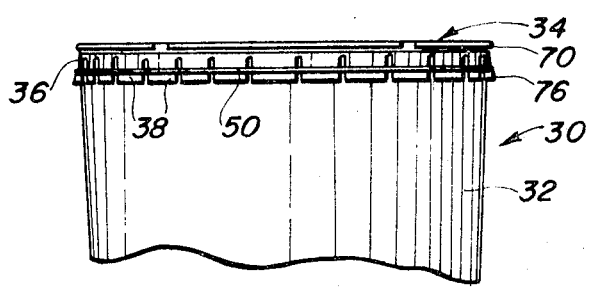
INVENTOR
GEORGE YATES, JR

CONTAINER CLOSURE TOOL AND METHOD FOR USE THEREOF

CROSS REFERENCE

This application is a continuation-in-part of applicant's copending application entitled RESILIENT CLOSURE HAVING RETAINING MEANS, Ser. No. 781,556, filed Dec. 5, 1968, and issued on Mar. 10, 1970 as U.S. Pat. No. 3,499,574.

BACKGROUND OF THE INVENTION

1. Field of the Invention

The invention relates to the container arts and particularly to a tool adapted to facilitate the use of closures adapted for locking engagement of the container bodies and employing movable sealing members in association therewith.

2. Description of the Prior Art

The aforesaid Ser. No. 781,556 application (U.S. Pat. No. 3,499,574, issued on Mar. 10, 1970) discloses a plastic closure assembly adapted for application to an open head container body comprising two flanges which form an inverted U-shaped channel provided with interlocking means adapted to engage the open end of the container body. The outer flange of the closure disclosed in the Ser. No. 781,556 application (U.S. Pat. No. 3,499,574, issued Mar. 10, 1970) is slotted to provide tabs which may be sprung outwardly in order to disengage the closure from the container body. A sealing or retaining member is provided to normally maintain the closure in engagement with the container body.

Through the use of the resilient closure arrangement of the aforesaid copending application, there has been demonstrated the need for a simple and easily used, yet reliable tool suitable for use on a mechanized basis in closing such containers. Accordingly, this invention has for its prime objective the provision of a closure tool of the character described.

A related object is to provide a method for securing such a closure to a container body in a simple, reliable system of reproducable mechanical steps.

SUMMARY OF THE INVENTION

The foregoing and other objects, advantages, and features of the present invention may be achieved with a tool adapted for use in locking a closure having a movable sealing member in place over the opening in a container body which tool comprises a rim member corresponding in shape to the configuration of the closure but having inner dimensions larger than the outer dimensions of the closure whereby the rim member may be slipped downwardly over the closure; handle means attached to the rim member at at least two points, and at least one stud disposed on the inner surface of the rim about the periphery thereof and adapted to contact the movable sealing member and move it into a locked position when the rim is slipped downwardly over the closure.

In its method aspects, the invention comprises a method of locking a closure having a sealing member onto a container body comprising the steps of applying the closure to the container body, positioning a tool of the foregoing type over the closure so that the studs contact the sealing member, and effecting relative movement between the closure and the tool so that the studs urge the sealing member into its locked position.

DESCRIPTION OF THE DRAWINGS

FIG. 1 is a top plan view of the tool produced in accordance with this invention;

FIG. 2 is a side-elevational view thereof;

FIG. 3 is a sectional view taken substantially along line 3—3 of FIG. 1;

FIG. 4 is an enlarged fragmentary top plan view of the closure applied to the container body;

FIG. 5 is an enlarged, fragmentary bottom view thereof;

FIG. 6 is a side-elevational view of this closure applied to the container body with the retaining means positioned in its locking arrangement;

FIG. 7 is a perspective view of the closure tool produced in accordance with this invention applied to a container closure combination;

FIG. 8 is an enlarged fragmentary sectional view thereof with the tool position just prior to actuation;

FIG. 9 is a similar view with the tool position midway of its actuation step; and FIG. 10 is a similar view with the tool having completed its actuation step.

DESCRIPTION OF THE PREFERRED EMBODIMENTS

With reference to the drawings, there is shown a closure tool 10 comprising an annular rim 12 and a handle 14 adapted to be gripped manually or to be received in a holder in a tool reciprocating machine. Handle 14 as shown in the drawings contacts rim 12 at two points but handle 14 could be of more complex configuration and could contact rim 12 at any number of points.

As best shown in FIG. 3, rim 12 comprises a relatively thick base section 16 and a thinner, downwardly projecting flange 18. Provided about the inner surface of flange 18 are a plurality of studs 20 having a height less than the height of flange 18 for a purpose that will hereinafter appear. The number and spacing of studs 20 is determined by means also described hereinafter.

One convenient method by which studs 20, which are preferably cylindrical in form, are mounted in rim 12 is shown in FIG. 3. Studs 20 have an upwardly projecting reduced diameter portion 22 which is force fit in a bore 24 provided in the base section 16 of rim 12. Of course, other methods of securing studs 20 in place may be used.

Closure tool 10 is designed for use with the resilient closure arrangement with sealing means of the previously described Ser. No. 781,556 application (U.S. Pat. No. 3,499,574, issued on Mar. 10, 1970). A closure and container body of the type disclosed in the foregoing copending application are illustrated in FIGS. 4–6, which, for convenience, will be briefly described. For a detailed description thereof, reference should be made to the Ser. No. 781,556 application (U.S. Pat. No. 3,499,574, issued on Mar. 10, 1970).

The closure-container combination 30 comprises an open end container body 32 which may conveniently have inwardly tapered sidewalls. A closure 34 may be positioned over the open end of the container body 32, and closure 34 comprises an inverted U-shaped channel, including an outer flange 36, which projects downwardly along sidewall of container body 32. Flange 36 preferably is formed into a plurality of tabs 38, and, as best shown in FIGS. 8–10, the inner surface of flange 36 has a detent-locking arrangement 40 (see FIG. 9) which is adapted to interlock with a bead 42 provided at the upper end of sidewall 32. A retaining means, taking the form of a sealing wire or its equivalent 50, is vertically movable between an upper position (see FIG. 8), in which tabs 38 are free to flex outwardly so as to disengage the detent-locking arrangement 40 from the container body bead 42, and a lower position (see FIGS. 6 and 10), in which the tabs 38 are maintained in such position that the locking arrangement is maintained, thereby effectively sealing the closure 34 onto the container body 32.

It is the provision of a simple mechanical tool to facilitate the mechanical movement of the sealing wire 50 between its FIG. 8 unlocked position and its FIG. 10 locked position, which forms the basis of this invention.

The manner in which the tool of FIGS. 1-3 functions to achieve this objective will now be described in detail. The rim 12 of tool 10 has a configuration generally similar to the outside configuration of closure 34, and particularly closure flange 36. These elements are generally cylindrical in the embodiment shown in the drawings, but it will be obvious to those skilled in the art that other cross-sectional configurations may equally well be used.

The inside diameter of rim flange 18 is sufficiently larger than the outside diameter of closure flange 36 so that the tool may be positioned downwardly over the container body 32 to which the closure 34 has been applied, as best shown in FIG. 7. With the tool 10 positioned on the closure as shown in FIG. 8, it will be seen that the diameter of a circle touching the innermost points of studs 20 is substantially the same or slightly larger than the outside diameter of depending flange 36. Thus, the flat bottom surfaces of studs 20 contact the upper surface of sealing wire 50 (see FIG. 8). When the machinery (not shown), which is capable of reciprocating tool 10, is set into operation, relative movement occurs between the tool 10 and the closure 34. FIG. 9 shows the midpoint of the operation in which the tool has moved downwardly in the direction of arrow A so as to cause the sealing wire 50 to move downwardly from its unlocked position shown in FIG. 8. Continued relative movement between the tool and the closure 34 results in the sealing wire being positioned in its FIG. 10 locked position.

Annular recesses 60, 62 are provided in the outer surface of flange 36 so as to provide a detent arrangement for maintaining the sealing wire 50 and its respective locked or unlocked positions. After the tool is moved to the position shown in FIG. 10 it is then withdrawn and the container with the locked-on cover may be removed.

The method for locking a container and closure in accordance with the present invention comprises an initial step of placing the closure over the container body so as to dispose the legs 38 in such position that the detent locking means 40 serves to maintain the closure on the container body. The container body closure combination is next positioned with the tool 10 placed downwardly over the top thereof as best shown in FIG. 7, followed by the step of moving the tool 10 downwardly to move the sealing wire 50 into locked position and thereafter withdrawing it.

As best shown in FIGS. 4 and 6, the closure 34 may comprise an outwardly extending flange 70 at the top of depending flange 36 in order to serve as a stop means to prevent the sealing band 50 from being slid all the way off the closure. Since flange 70 would interfere with the contacting of the band 50 by the studs 20, a plurality of cutouts 72 are formed in flange 70 (see especially FIG. 4), with cutout 72 being positioned about the periphery of closure 34 in correspondence with the locations of studs 20 about the interior of rim 12. A similar outwardly projecting bead or flange 76 is provided at the bottom of tabs 38 likewise to ensure that the sealing wire 50 does not slide completely off of the closure in a downward direction.

The foregoing closure tool provides a unique and useful arrangement for facilitating the easy locking of a resilient closure having retaining means on an open head container body, and this invention likewise comprises a new, useful, and unobvious method for securing such closures to the container body.

I claim:

1. A tool adapted for use in locking a closure having a movable sealing member over the opening in a container body comprising:

a rim member corresponding in shape to the configuration of the closure but having inner dimensions larger than the outer dimensions of the closure, whereby the rim member may be slipped downwardly over the closure;

handle means attached to the rim member at at least two points; and at least one stud disposed on the inner surface of the rim member about the periphery thereof and adapted to contact the movable sealing member and move it into a locked position when the rim member is slipped downwardly over the closure.

2. A tool, as claimed in claim 1, wherein a plurality of studs are positioned about the periphery of the rim member.

3. A tool, as claimed in claim 2, wherein the studs are spaced equidistant from one another.

4. A method for locking a closure having a movable sealing member onto the opening of a container body utilizing a closure tool comprising: a rim member corresponding in shape to the configuration of the closure but having inner dimensions larger than the outer dimensions of the closure, whereby the rim member may be slipped downwardly over the closure; handle means attached to the rim member at at least two points; and at least one stud disposed on the inner surface of the rim member about the periphery thereof and adapted to contact the movable sealing member; said method comprising the steps of:

positioning the closure over the opening in the container body with the sealing member in an unlocked position;

positioning a closure tool over the closure; and causing relative movement to occur between the tool and the closure whereby the studs contact the sealing member about the periphery of the closure and cause it to move into a locked position.

5. A method, as claimed in claim 4, wherein a plurality of studs are positioned about the periphery of the rim member.

6. A method, as claimed in claim 5, wherein the studs are spaced equidistant from one another.

* * * * *